United States Patent [19]
Rothe

[11] Patent Number: 5,267,771
[45] Date of Patent: Dec. 7, 1993

[54] MEANS OF FASTENING THE FOLDING TOP ON CONVERTIBLES

[75] Inventor: Karl Rothe, Bramsche, Fed. Rep. of Germany

[73] Assignee: Wilhelm Karmann GmbH, Osnabrueck, Fed. Rep. of Germany

[21] Appl. No.: 830,814

[22] Filed: Feb. 4, 1992

[30] Foreign Application Priority Data

Feb. 23, 1991 [DE] Fed. Rep. of Germany ... 9102150[U]

[51] Int. Cl.$^5$ .............................................. B60J 7/08
[52] U.S. Cl. .................................... 296/121; 296/107; 160/391
[58] Field of Search ............... 296/107, 116, 121, 136, 296/76, 208; 160/382, 383, 391, 398, 404; 87/6

[56] References Cited

U.S. PATENT DOCUMENTS

| | | | |
|---|---|---|---|
| 2,368,053 | 1/1945 | Voorhees | 160/391 |
| 2,782,070 | 2/1957 | Chaban | 296/76 X |
| 3,227,485 | 1/1966 | Geiger | 296/107 |
| 3,985,341 | 10/1976 | Akre | 188/77 R X |
| 4,640,178 | 2/1987 | Kurzbock | 87/6 |
| 4,991,640 | 2/1991 | Verkindt | 160/383 X |

FOREIGN PATENT DOCUMENTS

| | | | |
|---|---|---|---|
| 1192529 | 5/1965 | Fed. Rep. of Germany | 296/107 |
| 3818604 | 12/1989 | Fed. Rep. of Germany | 296/121 |

*Primary Examiner*—Dennis H. Pedder
*Attorney, Agent, or Firm*—Jordan and Hamburg

[57] ABSTRACT

A fastening arrangement for fastening an edge portion of a folding top of a convertible vehicle on a vehicle body includes a clamping element connected watertightly to the edge portion of the folding top. A strip element is connected to the vehicle body and a cooperable connection on the clamping element and on the strip element connect the clamping element and the strip element. The clamping element has an integrally formed stabilizer operable to stabilize the cooperable connection which connects the clamping element and the strip element, the clamping element and the strip element along with the cooperable connection means being disposed within a vehicle body cavity.

28 Claims, 4 Drawing Sheets

MEANS OF FASTENING THE FOLDING TOP ON CONVERTIBLES

The present invention relates to a means for fastening the folding top on convertibles.

BACKGROUND OF THE INVENTION

In a known means of fastening a folding top of this type (German patent 1,192,529), the material of the folding top is held in fastening formation constructed as a fastening groove by a clamping element, with which the material of the folding top is pulled in the form of a groove into the fastening groove. This means of fastening the folding top, which is disposed visibly in the rear part of the vehicle at the upper edge of the car body, forms a moisture-sensitive storage space, since the fastening groove is covered only by a bulge of folding-top material. The clamping element is constructed as a clamping wire and placed directly on the loop of the folding top material. The required clamping forces in the region of the fastening formation are associated with disadvantageous notching effects, which can damage the edge of the folding top material.

It is an object of the invention to provide the means of fastening a folding top, which are easily installed and provide a tension-proof, reliably tight connection between the material of the folding top and the body of the car in a visually unobtrusive fastening position.

The invention provides a means of fastening folding tops on convertibles, which, because of the clamping profile with the integrated clamping element that is connected in water-tight fashion with the edge of the folding top material, makes the easy installation of the folding top material with the car body clamping strip possible. In the clamped position, the loop-free edge of the folding-top material, which is held at the clamping profile, is exposed only to tensile stresses, so that a reliable, tight connection is produced with this method of clamping, which does not produce any notching effects. The shifting of the fastening formation into the covered car-body cavity region, with an invisible means of fastening the folding top, improves the overall visual impression of the rear part of the convertible vehicle.

With respect to further significant advantages and details of the invention, reference is made to the following description and to the drawing, in which an embodiment of the object of the invention is illustrated diagrammatically in greater detail. The following is shown in the drawing:

DESCRIPTION OF THE PREFERRED EMBODIMENTS

Figure 1:
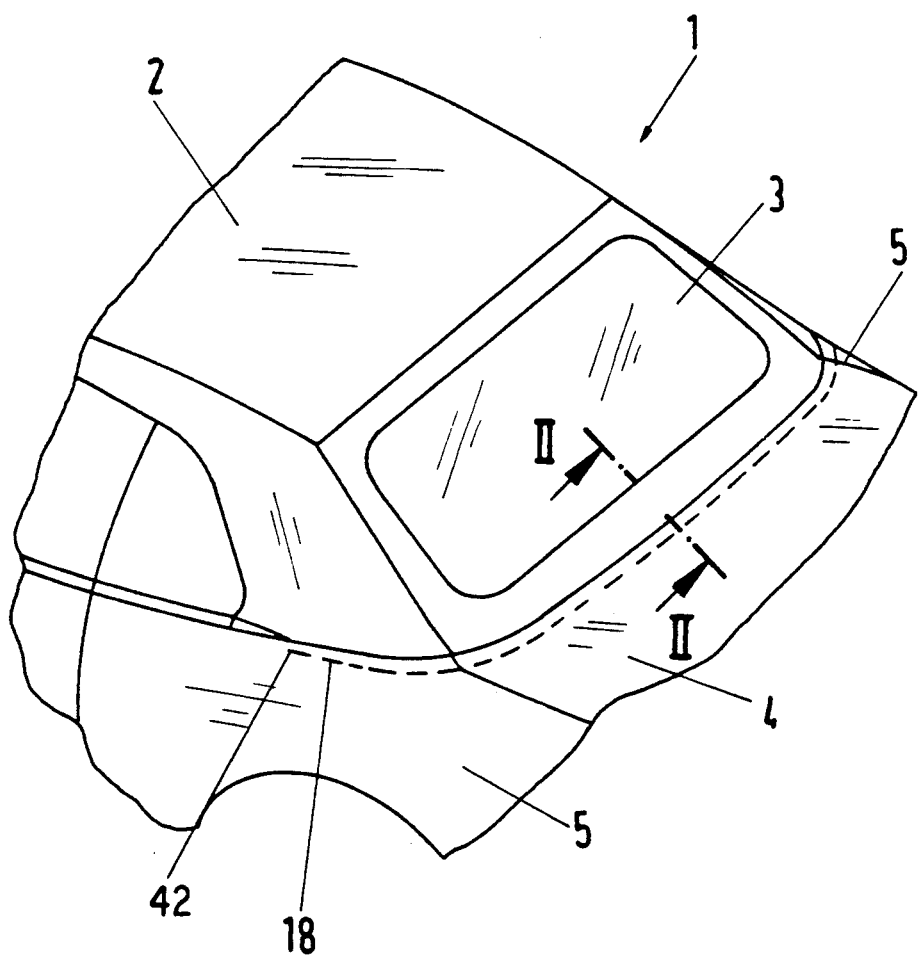
FIG. 1 shows a perspective partial view of the rear region of a convertible vehicle with the folding top in the closed state.

In FIG. 1, the rear part of the convertible vehicle, which is labeled 1 as a whole, together with the closed folding-top material, is illustrated. The edge region of the folding top material is lowered below a rear-view window 3 under an external trunk lid 4 and car body side parts 5 and kept hidden.

Figure 2:
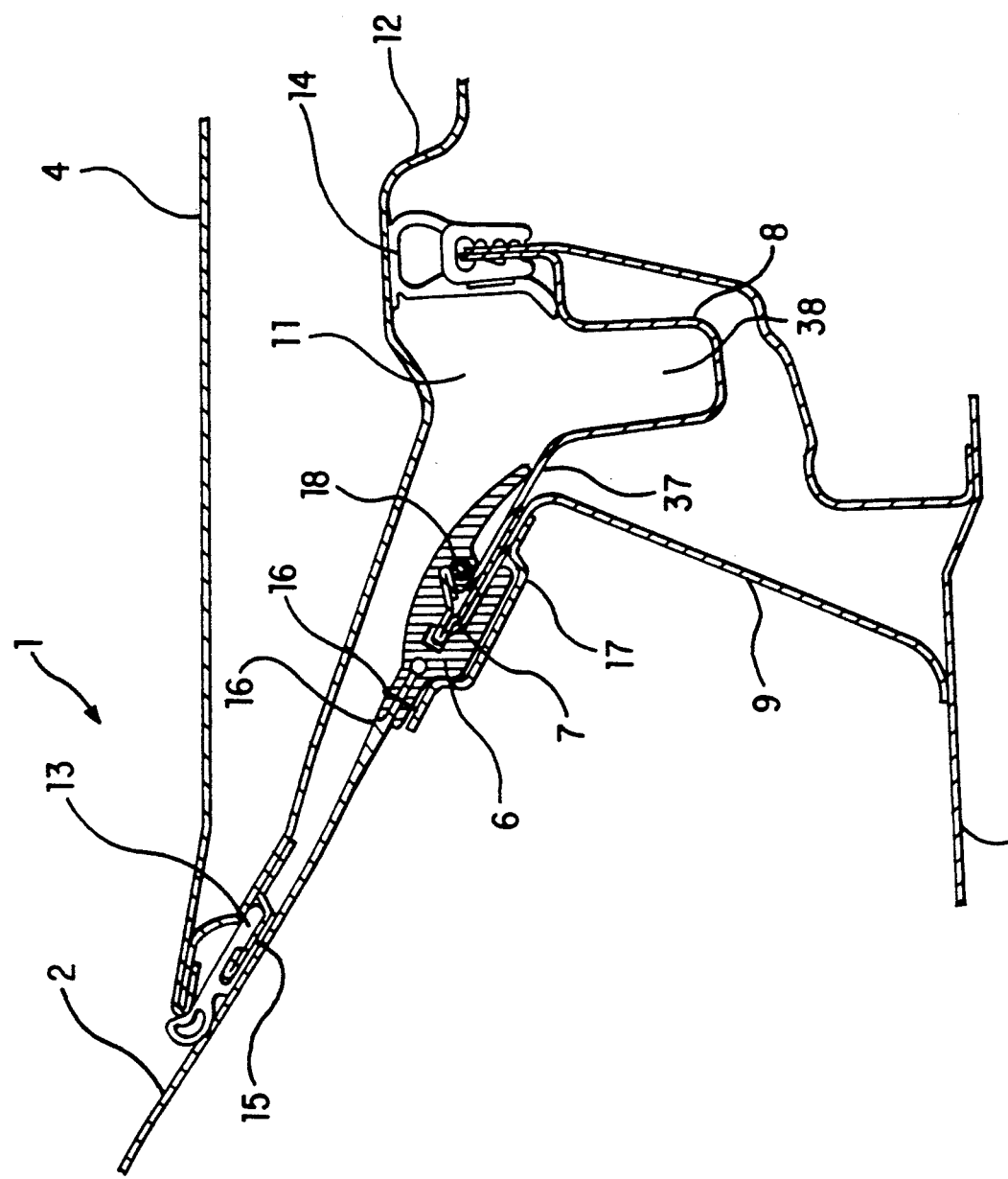
FIG. 2 shows an inventive means of fastening the folding top in the rear part of the vehicle along a section II—II in FIG. 1.

In FIG. 2, the fastening of the folding top material 2 in the rear part 1 of the vehicle is illustrated in sectional representation. In the region of its edge, the folding top material 2 has a terminating edge and a juxtaposed terminating edge portion which is connected in a water-tight manner with a clamping profile 6, which is braced with a car body clamping strip 7 that is held at body parts. At the same time, a fastening formation at the clamping profile 6 engages a corresponding counter formation at the clamping strip 7. In an appropriate embodiment, the car body clamping strip 7 is welded between parallel end regions of a water channel profile 8 and folding-top sheet metal 9. The folding-top sheet metal 9, which is supported at the fire protection sheet metal 10, is extended at an angle to the folding top material 2 and, in the parallel, covered end region, supports the water channel sheet metal 8, which, in turn, forms a car body cavity 11, which is closed off towards the top by the inner trunk lid flap 12. In the region of contact with the folding top material 2, the trunk lid 4 is provided with a friction-reducing Shut-off seal 13 and the inner trunk lid flap 12 lies on a car body engaging portion 14, which forms the boundary of the car body cavity 11.

Figure 3:
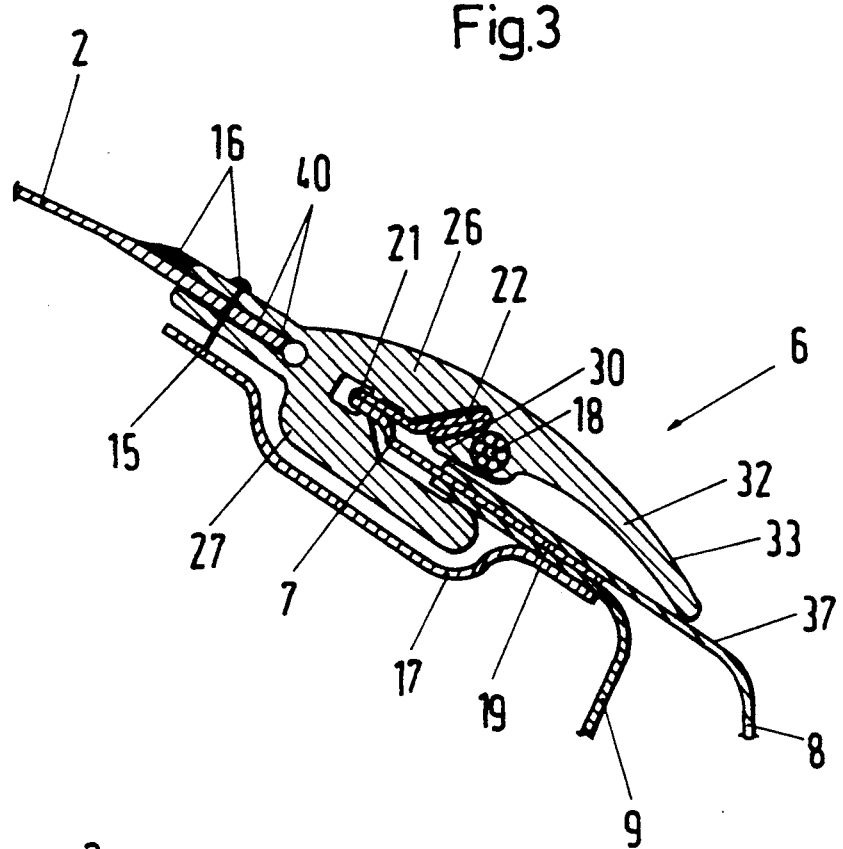
FIG. 3 shows an enlarged sectional representation of a clamping strip and a clamping profile in the connection position of FIG. 2, in which the folding-top material is tied down by sewing.

As can be seen particularly in FIG. 3, the connection between the clamping profile 6 and the folding top material 2 is brought about in the embodiment shown by a seam 15, in the region of which a sealants 16 for a water-tight shut-off is provided at least at the upper side of the folding top material 2.

To stabilize the car body clamping strip 7 in the area, in which it is connected with the clamping profile, an additional reinforcing profile 17, which is aligned at an angle and extends close to the folding-top material 2 and undergrasps the clamping strip 7, is disposed below the mutually overlapping, parallel end regions of the water channel sheet metal 8 and the folding top body metal sheets 9.

In the connection position of car body clamping strip 7 and clamping profile 6 shown, the folding top material 2 is stretched tight owing to the fact that a clamping element 18, which fastens the folding top material 2 without folds over the whole width of the rear part 1 of the vehicle in the region of the trunk lid 4 and the car body side parts 5 (FIG. 1), is integrated in the clamping profile 6.

Figure 5:
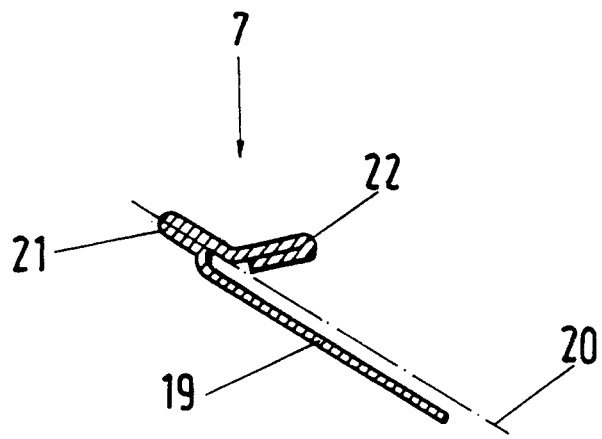
FIG. 5 shows the clamping strip of FIGS. 2 to 4 in an individual, sectional representation.

In FIG. 3, the braced connection position of the car body clamping strip 7 and the clamping profile 6 is shown on an enlarged scale. The car body clamping strip 7 is formed in one piece from profiled sheet metal (FIG. 5) the cross sectional shape of which has a flat base leg 19, which is accommodated between the parallel end regions of the water channel profile 8 and the folding top cavity sheet metal 9. To establish the connection with the clamping profile 6, the car body clamping strip 7 has a front, double-layered plug-in leg 21 and, adjoining this, a latch 22, which is bent back at an acute angle to the main longitudinal plane 25. To increase the stability, this latch 22 is advisably also double layered.

Figure 6:
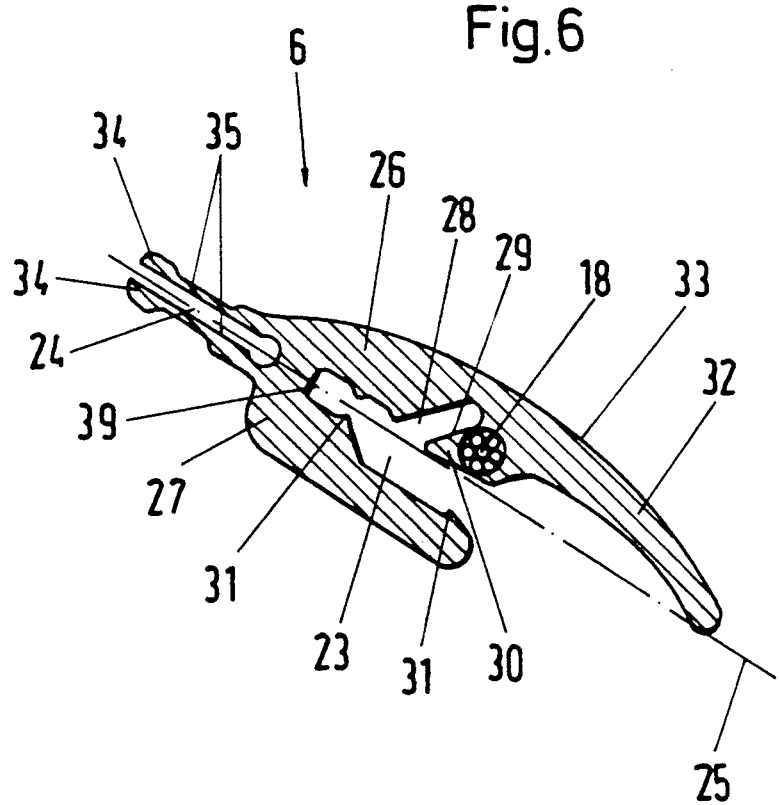
FIG. 6 shows the clamping profile of FIGS. 2 to 4 in an individual, sectional representation.

The clamping profile 6 is constructed as a one-piece, elastic plastic strip, which, at one end, has an accommodating space 23 directed to the clamping strip 7 and, at the other end, a connecting gap 24, which fastens the folding-top material 2 (FIG. 6). On either side of the main longitudinal plane 25, the accommodating space 23 is bounded by an upper covering leg 26 and a lower counter leg 27. At the covering leg 26, an accommodating pocket 28 is formed, which is engaged by the leg of the body clamping strip 7. Said leg is constructed as a latch 22 and lies against a bearing surface 29, which is presented by a latching hook 30 and is inclined at an acute angle to the main longitudinal plane 25.

In the region of the latching hook 30, the covering leg 26 has an integrated clamping element 18, which, in a preferred refinement, is as a molded rope insert and is integrated completely in the clamping profile 6 that is constructed, for example, as a PVC profile. At the rope ends of the clamping element 18 (FIG. 1), appropriate loops are provided, which are fastened with sheet metal screws 42 to the side parts 5 of the car body. With a clamping element 18 of such a construction in the form of a rope insert, the connection between the clamping profile 6 and the car body clamping strip 7 is stabilized over the whole of the clamping length, so that temperature-induced changes in length in the region where the folding top material is tied down are largely compensated for and there is no distortion of the folding top material 2.

At the counter leg 27, the clamping profile 6 of FIG. 6 has supporting bulges 31, which are directed to the accommodating space 23 and flexurally elastically support the clamping profile 6 in the connection position with the car body clamping strip 7, a plug-in chamber 39 accommodating the plug-in leg 21 in itself at least partially.

The covering leg 26 has a covering protection 32, which protrudes by essentially twice the amount over the counter-leg 27 and is constructed as an elastic supporting arc with a uniformly curved upper side 33, so that the means for fastening the folding top, in the inventive embodiment, do not offer any space, in which moisture might collect.

Figure 4:
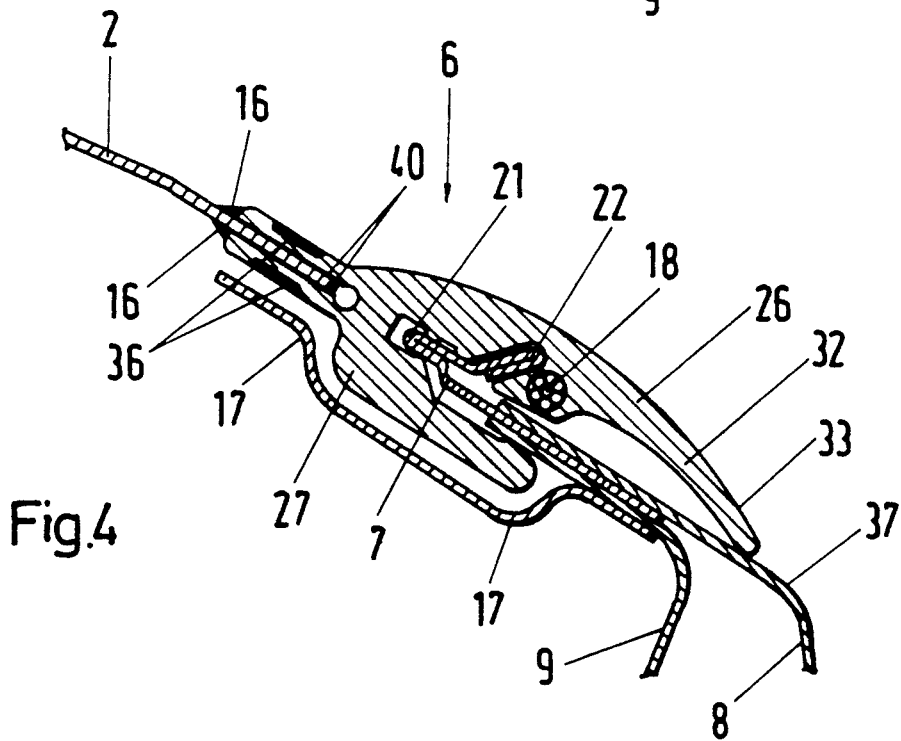
FIG. 4 shows a representation similar to that of FIG. 3, in which the folding top material is tied down by welding.

Two symmetrical connecting legs 34, between which the connecting gap 24 is formed, are developed on the clamping profile 6 on the side facing the folding top material 2. The inner connecting surfaces 35, which are present in the connecting gap 24, are constructed parallel, so that the folding top material 2 between these is held by the seam 15 (FIG. 3) or by a welded joint 36 (FIG. 4). A hot melt adhesive 40 can be introduced into the connecting gap 24 in order to improve the tightness further.

In the region of the entry of the folding top material 2 into the connecting gap 24, the sealant 16 is applied at least to the upper side of the folding top material 2 in such a manner, that a liquid, which possibly enters under the car body shut-off seal 13 (FIG. 2), passes over the connecting region to the upper side 33 of the clamping profile 6 and from there over an inlet inclination 37 into a transverse trough 38 (FIG. 2) of the water channel sheet channel metal 8. Towards the outside, this part of the car body is connected with an outlet opening (not shown), so that moisture does not remain in the car body cavity 11.

The object of the invention is not limited to the embodiment shown in the drawings and described above. Other refinements and modifications are also conceivable within the scope of the claims.

What I claim is:

1. A fastening arrangement for fastening an edge portion of a folding top of a convertible vehicle on a vehicle body comprising:
   a clamping element having water-tight connecting means connected water-tightly to said edge portion of said folding top;
   said clamping element extending generally in a longitudinal direction, said clamping element having a cross-sectional configuration taken perpendicular to said longitudinal direction which includes a forward facing groove means and a rearward facing groove means, said forwardly facing groove means receiving said edge portion of said folding top to thereby define at least a part of said water-tight connecting means;
   a strip element connected to said vehicle body; cooperable connecting means on said clamping element and on said strip element operable to connect said clamping element and said strip element, said rearward facing groove means receiving a part of said strip element to thereby define at least a part of said cooperable connecting means;
   said clamping element having an integrally formed stabilizing means operable to stabilize said cooperable connecting means which connects said clamping element and said strip element, said clamping element and strip element along with said cooperable connecting means being disposed within a vehicle body cavity.

2. A fastening arrangement according to claim 1, wherein said strip element has a forward end section and a rear end section, said rear end section being connected to said vehicle body, said forward end section having a plug-in leg disposed in a plane generally parallel to said rear end section and which forms at least a part of said cooperable connecting means which connects said clamping element and said strip element.

3. A fastening arrangement according to claim 2, wherein said strip element is formed from sheet metal with said plug-in leg being of double thickness sheet metal.

4. A fastening arrangement according to claim 1, wherein said strip element is elongated in said longitudinal direction, said strip element having a cross-sectional configuration taken perpendicular to said longitudinal direction which includes a generally flat base portion which is fixed to said vehicle body and an angled leg which extends at an acute angle relative to said base portion and which forms at least a part of said cooperable connecting means which connects said clamping element to said strip element.

5. A fastening arrangement according to claim 4, wherein said stabilizing means comprises an elongated stabilizing element disposed at least partly between said angled leg and said base portion from which said angled leg extends.

6. A fastening arrangement according to claim 4, wherein said base portion of said strip element has a rear end section connected to said vehicle body and a front end section from which said angled leg extends, said rear end section having a rear terminating end, said angled leg being disposed increasingly further away from said base portion as said rear terminating end is approached.

7. A fastening arrangement according to claim 4, wherein said strip element is formed from sheet metal with said angled leg being of double thickness sheet metal.

8. A fastening arrangement according to claim 1, wherein said clamping element has an imaginary main plane generally parallel to said longitudinal direction with a clamping element covering leg being disposed on one side of said main plane and a clamping element underlying leg being disposed on the other side of said main plane, said rearward facing groove means having opposed upper and lower groove parts, said forward facing groove means having opposed upper and lower groove parts, both of said upper groove parts being part of said clamping element covering leg, both of said lower groove parts being part of said clamping element underlying leg.

9. A fastening arrangement according to claim 8, wherein said cooperable connecting means comprises at least one protrusion in at least one of said upper and lower groove parts of said rearwardly facing groove means, said cooperable connecting means further comprising a groove formed between said upper and lower groove parts of said rearwardly facing groove means, said at least one protrusion extending into said groove.

10. A fastening arrangement according to claim 8, wherein said cooperable connecting means comprises an angled groove in said clamping element covering leg, said angled groove extending at an acute angle relative to said main plane, said angled groove opening up to said rearward facing groove means, said strip element having a forward portion received in said rearward facing groove means, said cooperable means further comprising an angle extension on said strip element, said angled extension extending at an acute angle relative to said main plane and received in said angled groove.

11. A fastening arrangement according to claim 1, wherein said stabilizing means comprises an elongated stabilizing element having an axis generally parallel to said longitudinal direction.

12. A fastening arrangement according to claim 11, wherein said elongated stabilizing element is completely embedded within said clamping element.

13. A fastening arrangement according to claim 11, wherein said stabilizing means comprising an elongated rope.

14. A fastening arrangement according to claim 10, wherein said clamping element and said strip element extend generally in parallel in said longitudinal direction, said stabilizing means comprising an elongated element having an axis generally parallel to said longitudinal direction, said elongated element being juxtaposed to said angled groove.

15. A fastening arrangement according to claim 8, wherein said upper groove part of said rearwardly facing groove means is approximately twice the length of said lower groove part of said rearwardly facing groove means.

16. A fastening arrangement according to claim 15, wherein said upper groove part of said rearward facing groove means is formed as a resilient support having an upper side having a convex surface.

17. A fastening arrangement according to claim 8, wherein said upper and lower groove parts of said forward facing groove means comprises spaced parallel legs.

18. A fastening arrangement according to claim 17, wherein said edge portion of said folding top is disposed between said parallel legs and a sewn part sews said portion and parallel legs together.

19. A fastening arrangement according to claim 18, wherein said water-tight connecting means comprises a sealant means disposed on at least a portion of said sewn part.

20. A fastening arrangement according to claim 17, wherein said edge portion of said folding top is welded to said parallel legs.

21. A fastening arrangement according to claim 17, wherein a hot-melt adhesive sealant is disposed between at least parts of said edge portion of said folding top said parallel legs.

22. The combination comprising:
(I) a vehicle body;
(II) a folding top having an edge portion;
(III) a fastening means fastening said folding top to said vehicle body, said fastening means comprising:
  (a) a clamping element,
  (b) water-tight connecting means connecting said clamping element to said edge portion of said folding top;
  (c) a strip element,
  (d) connecting means connecting said strip element to said vehicle body,
  (e) cooperable engagement means on said clamping element and on said strip element operable to connect said clamping element and said strip element, and
  (f) stabilizing means integrally formed with said clamping element and operable to stabilize said connection between said clamping element and said strip element,
(IV) cavity means in said vehicle body in which said fastening means is disposed, said cavity means being partly define by a vehicle trunk lid which overlies said fastening means.

23. The combination according to claim 22, wherein said trunk lid has a forward edge portion, and a low-friction seal means between said forward edge portion and said folding top.

24. The combination according to claim 22, wherein said cavity means is formed by a first body part sloping downwardly and rearwardly from said fastening means, and a second body part disposed rearwardly of said first body part, said second body part defining a water channel groove.

25. The combination according to claim 24, wherein said cavity means is partly defined by a vehicle trunk lid which overlies said first and second body parts, and a seal means disposed on said second body part rearwardly of said water channel groove, said seal means making a sealing engagement with said trunk lid.

26. The combination according to claim 22, wherein said vehicle body comprises two parallel and overlapping body parts, one of said overlapping body parts being the upper portion of a water channel groove formed in said cavity, said strip element having a base portion sandwiched between said two parallel and overlapping body parts.

27. The combination according to claim 22, wherein said vehicle body further comprises a sheet metal bottom member underlying said fastening means.

28. The combination according to claim 22, wherein said stabilizing means comprises an elongated element having end portions extending from said clamping element, and fastening means fastening said end portions to said vehicle body.

* * * * *